United States Patent [19]

Dawson

[11] 4,081,677
[45] Mar. 28, 1978

[54] ISOTOPE SEPARATION BY MAGNETIC FIELDS

[75] Inventor: John Myrick Dawson, Pacific Palisades, Calif.

[73] Assignee: TRW Inc., Redondo Beach, Calif.

[21] Appl. No.: 658,567

[22] Filed: Feb. 17, 1976

Related U.S. Application Data

[62] Division of Ser. No. 562,993, Mar. 27, 1975.

[51] Int. Cl.² ........................................... H01J 39/34
[52] U.S. Cl. ................................. 250/290; 250/281; 250/282
[58] Field of Search ..................... 313/231.3, 231.4; 315/111.7; 250/251, 281, 282, 298, 290

[56] References Cited

U.S. PATENT DOCUMENTS

| | | |
|---|---|---|
| 2,632,112 | 3/1953 | Washburn et al. ............... 250/41.9 |
| 3,257,579 | 6/1966 | Delcroix et al. .................. 250/251 |
| 3,265,583 | 8/1966 | Baker et al. ..................... 315/111.7 |
| 3,485,716 | 12/1969 | Bodner ........................... 315/111.7 |
| 3,649,827 | 3/1972 | Bell et al. ........................ 250/298 |
| 3,668,068 | 6/1972 | Watson ........................... 315/111.7 |
| 3,845,300 | 10/1974 | Rochling ......................... 250/282 |

Primary Examiner—Alfred E. Smith
Assistant Examiner—B. C. Anderson
Attorney, Agent, or Firm—Edwin A. Oser

[57] ABSTRACT

One of the isotopes of an element having several isotopes can be separated from the others in a dense, neutral plasma. Thus initially a neutral plasma is prepared including the element in question. This may consist of positive ions and negative electrons or alternatively of positive and negative ions, or else of a mixture of positive ions, negative ions and electrons. The plasma may then be injected into a magnetic field or may be generated in the field where more energy is imparted to a selected isotope than to the others. Finally, the isotopes are separated from each other on the basis of their differential energies. For example, the selected isotope may be given more energy than the others by stimulating it within the plasma at its resonant frequency which may be close to the cyclotron frequency, either by an electric field or by a magnetic field. In order to excite the other isotope, a different resonant frequency is required which depends on the plasma density, the relative concentration of electrons if the plasma contains electrons, the strength of the magnetic field, the ratio of charge to mass of the isotope, and possibly on the physical parameters of the plasma apparatus itself, such as the ratio of the length of the plasma column to its radius. The more energetic isotope may be separated by energy dependent chemical reactions, it may be collected by a positively biased probe or else the isotopes may be separated from each other by magnetic fields or in various other ways.

10 Claims, 16 Drawing Figures

ISOTOPE SEPARATION BY MAGNETIC FIELDS

This is a division, of application Ser. No. 562,993, filed Mar. 27, 1975.

BACKGROUND OF THE INVENTION

This invention relates generally to the separation of isotopes from each other and particularly relates to a more inexpensive way for separating isotopes in a substantially neutral, dense plasma.

Presently the principal means for separating uranium isotopes on a commercial basis is the gaseous diffusion process. In order to increase the capacity of such diffusion plants a heavy capital investment is required which may be on the order of many hundred million dollars per year.

On the other hand, in recent years research in many countries and by many people has produced a vastly superior knowledge and insight the nature of plasmas. Particularly, our knowledge of the behavior of dense plasma has been much increased. Isotope separation in a dense plasma should permit the separation of much larger quantities of the desired isotopes at much lower cost and with less expenditure of energy. Furthermore, separation of isotopes in a dense plasma is facilitated by the fact that plasma devices exist which can be used for similar processes. Among these devices are the so-called Q-machines.

It is well known that a beam of charged particles cannot exceed a certain density because the charged particles tend to repel each other. On the other hand, in a neutral plasma no matter how dense, individual charged particles are neutralized by other particles of opposite charge. Therefore, a plasma can be made much denser than a charged beam.

It will be evident that a less expensive method for separating isotopes will make it possible to utilize isotopes for purposes which in the past have simply been too expensive. For example, such isotopes may have many uses in medicine. They may also be useful for light sources generating monochromatic light, that is light generated by a single isotope of a suitable element. Similarly, it may be desirable to manufacture lasers containing as a laserable material a single isotope of a suitable element. Single isotopes may also be used for nuclear reactors. In this case it may be desirable to utilize a special isotope which has the best neutron properties for the reactor such as an especially large or small neutron absorption cross-section.

Various methods have been suggested in the past for separating isotopes besides the gaseous diffusion process. Among these methods are the use of a laster for exciting a particular energy level of one isotope without exciting the other isotopes. This may require a tunable laser for optically exciting say the uranium isotope 235 preferentially over the 238 uranium isotope. The excited uranium atom may now be more readily ionized as distinguished from the unexcited ion so that a separation of the charged and neutral isotopes can easily be carried out. Such a separating method has been described, for example, in the U.S. Pat. to Pressman No. 3,558,877. A similar two photon scheme for exciting and subsequently ionizing a selected isotope has been described in the U.S. Pat. to Levy et al. No. 3,772,519. The use of a laser to cause ionization of gas by the electric field caused by a focused laser beam has been disclosed in the U.S. Pat. to Brubaker et al. No. 3,478,204.

Also, the use of laser beams for the formation of plasma or for bombarding microparticles has been suggested in the U.S. Pat. to Vali et al. No. 3,360,733 and Hansen et al. No. 3,679,897.

Plasma confining devices having magnetic mirrors are well known in the art. An example of such a U.S. Pat. is the patent to Delcroix et al. No. 3,257,579. The use of a diverging magnetic field, sometimes called a magnetic nozzle, has been proposed for the separation of at least two isotopes in the U.S. Pat. to Roehling No. 3,845,300.

Finally, reference is made to a paper by Hidekuma et al. which appears in Physical Review Letters of Dec. 23, 1974, Volume 33, No. 26, pages 1537 –1540. This paper proposes to plug or retain desired ion species and permit the others to escape from a container. This is effected by a magnetic cusp created by suitable magnetic fields. The purpose of the experiment was to permit impurities contained in the reactor to escape while retaining the desired particles.

It is therefore an object of the present invention to provide a novel method of and apparatus for the separation of isotopes of various elements which is substantially less expensive than presently known methods.

Another object of the present invention is to provide a novel process for separating isotopes making use of a plasma of relatively large density, thereby increasing the yield of such a method.

A further object of the present invention is to provide a method of and apparatus for separating isotopes which is applicable to many elements having more than one isotope.

SUMMARY OF THE INVENTION

The method in accordance with the present invention comprises basically three steps. Initially, a substantially neutral, dense plasma is generated including the isotopes in question. For example, the plasma may consist of positive ions which are neutralized by electrons. On the other hand, it may be necessary to generate negative ions including the isotopes to be separated. In that case, the plasma must be neutralized by suitable positive ions. Finally, a neutral mixture of positive and negative ions and electrons may be used. The next step is to inject this neutral, dense plasma into a magnetic field where one of the isotopes is given more energy than the others. It should be emphasized, however that it is also feasible to generate the plasma in the magnetic field so that it does not have to be injected. The differential energy may, for example, by imparted by selectively driving the desired isotope at its resonant frequency which is close to, but different from the cyclotron frequency of the isotope. The corresponding collective resonant frequency of the majority isotope species may, however, differ substantially from its own particular cyclotron frequency. The collective resonant frequencies will generally depend on the plasma density, the relative concentration of electrons if the plasma contains electrons, the strength of the magnetic field, the ratio of charge to mass of the particular isotope and probably on the physical parameters of the plasma apparatus itself such as the ratio of the plasma column length to its radius. Finally, the selected isotope is separated from the others on the basis of their differential energies. This may, for example, consist of a differential diffusion of the ions across a magnetic field, or magnetic mirrors may be utilized which confine the more energetic species. Many other ways will be discussed hereinafter for separating one isotope from the other on the basis of their differential energies, including energy dependent chemical reactions. Also, many ways will be discussed hereinafter for generating the required plasma and for imparting differential energies to the various isotopes.

The novel features that are considered characteristic of this invention re set forth with particularity in the appended claims. The invention itself, however, both as to its organization and method of operation, as well as additional objects and advantages thereof, will best be understood from the following description when read in connection with the accompanying drawings.

DESCRIPTION OF THE PREFERRED EMBODIMENTS

Figure 1A:
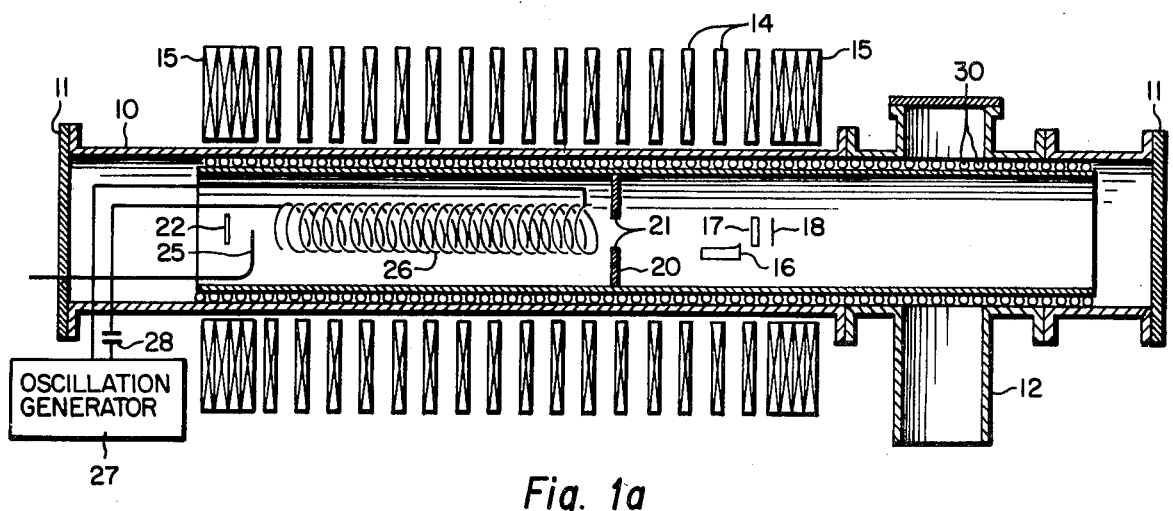
FIG. 1a is a schematic cross-sectional view through a conventional Q-machine which has been modified to separate potassium isotopes from each other, utilizing an oscillating magnetic field to generate inductively an oscillating electric field.

As explained hereinabove, the separation or enrichment of a selected isotope requires basically three different and consecutive steps: In the first place it is necessary to create a plasma which is substantially neutral and relatively dense. The density of the plasma should be on the order of $10^{10}$ to the order of $10^{12}$ particles per cubic centimeter. The plasma may either consist of positive ions neutralized by electrons or of negative ions neutralized by a suitable positive ion. Alternatively, the plasma may consist of a mixture of electrons and negative ions which is neutralized by positive ions. The ions may either consist of the element to be separated or else of a chemical compound containing the element to be separated.

As the next step in the process it is now necessary to impart a differential energy to the isotopes to be separated. This can be effected in many ways which will subsequently be discussed. For example, the minor isotope, that is the isotope which is rarer, may be given more energy than the major isotope. Many ways will be described hereinafter how this can be accomplished.

As the last step the two isotopes having previously acquired a differential energy are now separated on the basis of their differential energies. Again, this can be accomplished in many different ways which will be discussed hereinafter.

Before discussing the equipment and the methods of the invention for imparting differential energies to the isotopes the generation of the plasma will now be described.

GENERATION OF A DENSE, NEUTRAL PLASMA

One of the simplest cases is the generation of a plasma consisting of an alkali metal. Thus a plasma consisting of potassium can be readily generated in the following manner. The potassium is heated in a suitable furnace in an evacuated space. The potassium atoms or the beam of potassium is now directed toward a hot electrode which may, for example, consist of tunsten, tantalum or rhenium. When a potassium atom impacts upon the hot electrode it will be ionized to create a positive potassium ion. Electrons are continuously emitted by the hot electrode. These electrons neutralize the ions formed. The number of electrons depends on the electric field generated by the ions which in turn is a function of temperature.

Instead of evaporating potassium it is also feasible to start with potassium chloride which is then sufficiently heated to break the molecular bond and hence to generate some neutral potassium atoms, chlorine atoms as well as potassium and chlorine ions. The process can then be continued as described before.

Many other methods are readily available for generating a plasma containing the other alkali metals. Such a plasma can either be generated within a steady longitudinal magnetic field in the manner of a Q-machine or else the plasma can be subsequently introduced into the magnetic field. This latter process may, for example, be necessary where the hot element is generated by filaments. The filaments can be spread out outside of the magnetic field to provide sufficient space between adjacent filaments.

One method of separating the isotope $^{41}K$ is a chemical separation method. The $K+$ can be generated in a plasma as just described. The following reaction is endothermic and proceeds with the more energetic one of the isotopes.

$$^{41}K^+ + CF_4 \rightarrow {}^{41}KF + CF_3^+ \qquad (1)$$

Now the potassium fluoride can readily be separated by a chemical process.

Similarly the chlorine isotope $^{37}Cl$ can be prepared from a neutral plasma containing $K+$. For example, carbon tetrachloride may be added to the plasma and the following reaction takes place.

$$e^- + CCl_4 \rightarrow CCl_3 + Cl^- \qquad (2)$$

Subsequently $CH_3Br$ is added which in turn will cause formation of $CH_3Cl$ and the following reaction takes place.

$$Cl^- + CH_3Br \rightarrow CH_3Cl + Br^- \qquad (3)$$

Reaction (3) is exothermic and can be used to separate ions on the basis of their energies. Thus if the chlorine isotopes of mass 35 and 37 are differentially heated so that chlorine 37 becomes less energetic, the reaction proceeds only with $^{37}Cl^-$. A similar reaction takes place with $CH_3F$.

A plasma containing uranium will generally have to be generated in a similar manner. For example, the uranium may be separated as follows:

$$U^+ + AB \rightarrow UA + B^+ \qquad (4)$$

In the above reaction A stands for fluoride, chloride, nitrogen, oxygen, carbon and the like.

In case the reaction is endothermic, the separation can be effected by selectively heating the ion of the desired isotope. On the other hand, if the reaction is exothermic the production of the desired isotope ion is obtained by selectively heating the remaining species of the isotope.

It is also feasible to utilize selective reactions on the basis of the respective cross-sections which depend on energy. This is true even where the energy thresholds for the reaction are not important.

Another approach which is more promising is to carry out selective reactions using negative ions generated from $UF_6$ (uranium hexafluoride) which is a volatile uranium compound. Uranium hexafluoride has a relatively high vapor pressure at room temperature amounting to 100 tor. Further, uranium hexafluoride has a high electron attachment energy and hence readily forms negative ions.

For example, the following reaction will take place:

$$UF_6 + e \rightarrow UF_5^- + F, \qquad (5)$$

where $UF_5$ is uranium pentafluoride.

In this case it will be noted that instead of a positive ion a negative ion is generated which now must be neutralized by a suitable positive ion such as $K+$.

The uranium pentafluoride ion may undergo an exothermic electron transfer reaction with the uranium hexafluoride as follows:

$$UF_5^- + UF_6 \rightarrow UF_6^- + UF_5 \qquad (6)$$

The uranium isotope ion may now be separated, for example, by means of a dissociation caused by a suitable collision of the energetic molecule containing the desired isotope in the following manner:

$$UF_6^- + Xe \rightarrow UF_{6-n}^- + nF + Xe, \qquad (7)$$

where $n$ stands for an integer smaller than 6. Again a chemical separation may be carried out. Instead of causing the uranium hexafluoride to impact with xenon it is also feasible to use argon or some other noble gas for the collisions, or even inert particles.

It is also feasible that the uranium pentafluoride ion undergoes the following reaction with $BF_3$.

$$UF_5^- + BF_3 \rightarrow UF_4 + BF_4^- \qquad (8)$$

Another reaction which may be used produces the formation of $UF_5CN^-$ in the following manner:

$$UF_6^- + HCN \rightarrow UF_5CN^- + HF \qquad (9)$$

Other chemical changes with uranium which permit the chemical separation of one isotope from another involves similar compounds of uranium with another halogen such as chlorine, bromine or iodine. For example, the following reaction may take place:

$$UCl_4 + Xe \rightarrow UCl_3 + Cl \qquad (10)$$

It will be understood that again other noble gases or inert particles may be used for the dissociation process, as well as other compounds of uranium and chloride such as uranium hexachloride.

Selective charge exchange may also be carried out with other atoms or molecules. In this case the reaction should be carried out on the basis of energy.

It is possible that an electron exchange takes place between the two isotopes 235 and 238 of uranium hexafluoride. By selecting a suitable energy the reaction may take place in a desired direction.

A neutral plasma containing both negative uranium ions and positive ions may involve the following reaction.

$$Cs + UF_6 \rightarrow Cs+ + UF_6- \qquad (11)$$

This will directly produce the desired plasma which is neutral. This reaction may take place by direct contact of the two vapors. The attachment energy for adding an electron to the uranium hexafluoride is 4eV (electron volts). Similarly, 3.8 eV are required to remove an electron from the cesium. The above reaction including cesium involves a charge transfer. Reactions of this type typically have large cross-sections because they can take place at large separations. Thus this type of reaction can be expected to compete favorably against other reactions such as:

$$Cs + UF_6 \rightarrow CsF + UF_5. \tag{12}$$

The latter reaction requires contact between the molecules. Other reactions involving cesium are also feasible.

IMPARTING DIFFERENTIAL ENERGY TO THE ISOTOPES

As explained hereinbefore, the second step in the method of the present invention is to impart differential energy to the isotopes of a particular element. This may, for example, be effected by making use of the collective resonance near the cyclotron frequency of the isotope in question. Since this process takes place in a relatively dense plasma, the cyclotron frequency is modified by the effects of the number of particles in the plasma, the strength of the magnetic field, the ratio of the electric charge to the mass of the isotope and other factors such as the physical dimensions of the plasma. The electric charge separation of the plasma components may cause the collective resonant frequency of the major isotope to depart substantially from its own cyclotron frequency. At the same time it will also depart from the collective resonant frequency of the minority isotope which now is somewhat closer to its own particular cyclotron frequency. The net result of these collective resonant separation effects or charge separation effects may cause the further enhancement of that portion of the resonant frequency separation which is due to differences in the ion cyclotron frequency alone. It may also minimize the effect of the major species resonance altogether because of variations of this frequency in different regions of the plasma. The latter effect is one of several that may induce what is sometimes referred to as resonance broadening.

Differential excitation of one isotope in the case of potassium will now be explained in connection with FIGS. 1a and 1b.

Figure 1B:
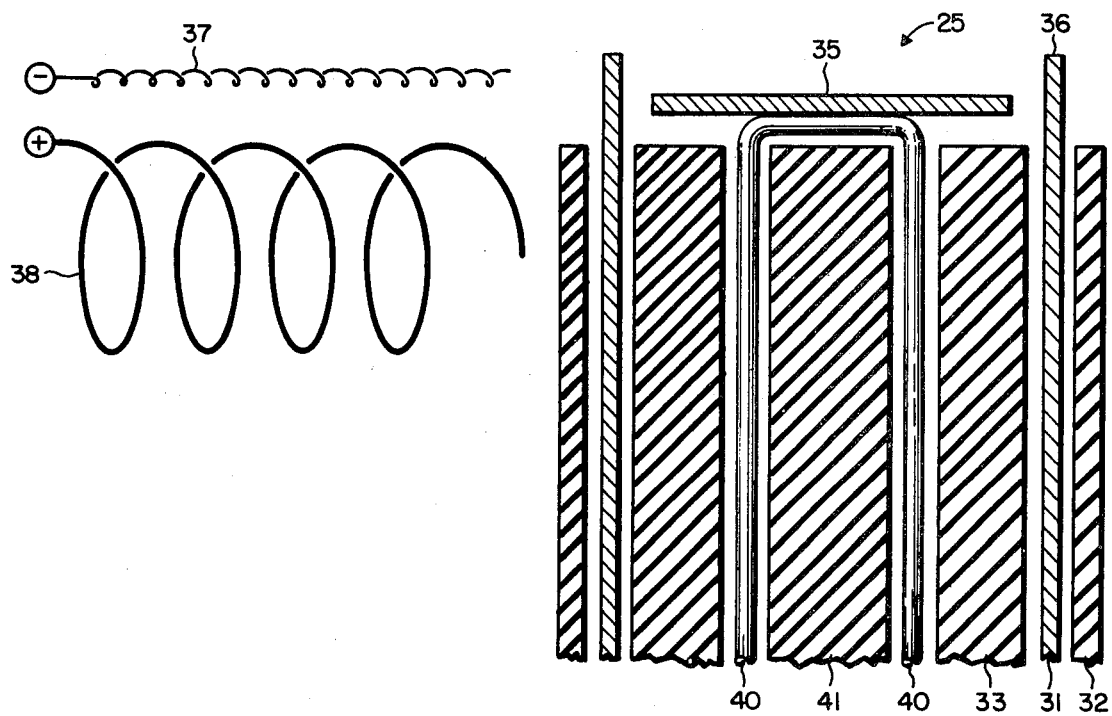
FIG. 1b is a cross-sectional view on enlarged scale of the probe which may be utilized with the apparatus of FIG. 1a and also depicting the paths of an ion and an electron.

FIG. 1b illustrates, by way of example, a particular probe and will be subsequently discussed.

FIG. 1a illustrates a conventional, but modified, Q-machine which may, for example, consist of a cylindrical envelope 10 closed at both ends by end plates 11 and which may have a side tube 12 for connecting the tube to a vacuum pump and other auxiliary equipment.

About the tube 10 are disposed coils 14 which may be annular and which surround the tube 10. The coils 14, when energized, generate a steady longitudinal magnetic field. As shown at 15, the coils at both ends are closer together to generate a denser magnetic field, usually known as a magnetic mirror.

The potassium may be evaporated from an oven shown schematically at 16 and which may be maintained at a temperature on the order of 250° C (centigrade). The evaporated potassium then hits a hot plate 17 which may be maintained at a temperature on the order of 2,000° C. The plate 17 may be heated by a filament 18, the power supply for which has not been illustrated for the sake of clarity.

The relative temperatures of the oven 16 and the hot plate 17 determine the ratio of electron emission to potassium ion production. In other words, a potassium atom which hits the hot plate 17 will loose an electron to generate a positive potassium ion. Electrons are continuously emitted due to the thermionic effect of the hot plate. The hot plate may consist, for example, of tungsten, tantalum or rhenium. The ions and electrons which now make up a dense neutral plasma move toward the left of FIG. 1a in accordance with their thermal velocities and pass through a circular opening 21 in a shield 20. The plasma may have a density of $10^{10}$ to $10^{12}$ particles per cubic centimeter. The pressure may be about $10^{-2}$ to $15^4$ atmosphere and the temperature between 1000° and 20,000° C.

Accordingly, the plasma proceeds toward the left where it is collected by a collector 22. The voltage of the plasma with respect to the collector 22 may be between 0 and +3 volts depending on the temperatures of the oven 16 and the hot plate 17. The voltage between the shield 20 and the collector 22 may be on the order of +0.1 to +0.5 volts. Since the ions must extract the electrons from the hot plate 17, the plasma itself may be at a positive voltage with respect to the plate 17 which may be considered to be at ground potential. There is also provided a probe 25 disposed between the shield 20 and the collector 22 in the path of the plasma for collecting the isotope which has acquired the higher energy, in this case the potassium 41 isotope. A range of oscillation frequency is possible with this device. This includes the collective resonant frequency of both ion species. While an isotope is being resonantly driven or "heated" individual ions of the other isotope are periodically energized and deenergized by the driving field. The net result is a large fractional energy difference between the resonant and the nonresonant ionized isotopes.

In the space between the shield 20 and the collector 22 there is provided a coil 26 for generating another magnetic field through which the plasma passes. This is an oscillating magnetic field and may be generated by connecting the coil 26 to an oscillation generator 27. A capacitor 28 may be disposed in one of the leads connecting the generator 27 to the coil 26 to provide a series resonant circuit which tends to oscillate at the frequency of the generator 27. The result is that an oscillating inductive field is developed in a direction transverse to the direction of travel of the plasma.

This will be more fully explained hereinafter.

The shield 20 operates as a heat shield to shield the walls of the envelope 10 from the high temperature of the hot plate 17. By cooling the walls of the envelope 10, a low vapor pressure can be maintained and hence a substantially neutral plasma is obtained.

Additionally, a refrigeration coil 30 may be provided within the tube 10 and substantially along the entire length of the tube. The coil 30 may be maintained at room temperature or below by cold water or may even be refrigerated.

Due to the effect of the oscillating electric field combined with the longitudinal magnetic field and the thermal velocity of the ions, the ions assume a helical path from right to left as viewed in FIG. 1a.

The probe 22 is illustrated in greater detail in FIG. 1b to which reference is now made. It may, for example, include a cylindrical shield 31 which may consist, for example, of tantalum. It is insulated by two insulating cylinders 32 and 33 which may, for example, consist of alumina. A circular plate-like collector 35 is disposed within the shield 31 and below the outer edge 36 thereof.

Curve 37 illustrates the path of an electron which has a very small transverse motion and therefore cannot penetrate to the collector 35. Curve 38 shows the path of an ion which has a much larger transverse motion and hence is able to impact on the collector 35 over the edge 36 of the shield 31. The collector 35 may be supported by a heater wire 40 for outgassing it and may be insulated by an insulating rod 41. However, during isotope separation, the collector 25 should be maintained cold as is the collector 35 so that the captured ions will not evaporate again. Hence the collector 35 may be cooled in any conventional manner.

The effects of the motions of the ions and electrons in a plasma of the type generated in the apparatus of FIG. 1a will now be explained. It may be convenient to explain first the cyclotron motion to which a charged particle is subject under the influence of a magnetic field. The magnetic force acts at right angles to the velocity of a charged particle. Thus the vectors of the force and of the velocity form an angle of 90°.

The cyclotron frequency is determined by the ratio of the charge to the mass of the particle multiplied by the magnetic field and divided by the light velocity. The Larmor radius is proportional to the square root of the particle energy divided by the cylotron frequency.

It is now possible to excite a charged particle by subjecting it to an oscillating electric field of a frequency close to but different from the cyclotron resonant frequency.

In this case there must be both a magnetic field and an electric field at right angles, the electric field having a component parallel to the motion of the particle. The frequency with which the electric field varies should be such that the particle has an increase in energy or velocity. Thus the particle is accelerated along a spiral or cycloidal path. As a result, the particle has a translational velocity at right angles to the electric field.

If the particle is driven by its own resonant frequency it will continue to gain energy. On the other hand, a particle or ion that is out of resonance will vary its energy in a manner determined by the square of a sine function. On the other hand, an ion which is in phase consistently increases its energy according to the square of time. As a result, a particle which is in resonance with the oscillating electric field will gain energy or will become "heated". The period of time may be so selected that there is a maximum difference on the average between the energy of a particle in resonance and another particle which is not in resonance.

Thus it is feasible to excite one isotope which occurs as a small percentage of the total ionized isotope population at its collective resonant frequency which may be near the cyclotron resonant frequency. However, it should be realized that even in this case the collective resonant frequency which is different from the cyclotron frequency may be close thereto. The other isotope is only heated when it is subjected to its collective resonant frequency. The reason for the difference in behavior between the two ion species is that the collective motions of the more abundant isotope induces electrical forces within the plasma due to charge separation. This modifies the circular motion of the ions effected by the steady magnetic field alone. On the other hand, the motions of the minor isotope causes much less charge separation and hence smaller electric fields and smaller shifts in the resonant frequency. To a large extent charge separation due to the motion of the minor isotope is cancelled by an almost equal, but opposite, separation of the major isotope. This motion of the major species, however, involves little energy because only a small motion of the major species is required to balance the motion of the minor species.

A detailed account of this phenomenon, therefore, also depends upon specific parameters of the plasma device. However, the following quantitative expression is applicable to a plasma slab confined by the two unbounded plane surfaces. It serves to illustrate the most important features of this resonant frequency dependence upon collective ion motions:

$$E_x = \frac{4\pi Q}{1 + \sum_l \frac{\omega_{pl}^2 (1 - i\frac{\nu_l}{\omega_0})}{\omega_{cl}^2 - \omega_0 + 2i\omega_0 \nu_l}} \tag{11}$$

where $l$ indicates the species of the charged particles; and $\omega_{pl}$ is the plasma frequency for the $l$th particle or associated with the corresponding ion species which is determined as follows:

$$\omega_{pl}^2 = \frac{4\pi e^2 n_l}{m_l} \tag{12}$$

In formulas (11) and (12):

$E_x$ is the electric field within the plasma slab in the direction perpendicular to the planar boundaries.

$e$ is the charge of the electron $n_l$ is the number density of particles for the $l$th isotope or species $m_l$ is the mass of the $l$th isotope Further, in equation (11)

$\omega_{cl}$ is the cyclotron frequency, for the $l$th species.

$\omega_o$ is the driving frequency $\nu_l$ is the effective collision frequency for the $l$th species and $i$ is $\sqrt{-1}$ If one sets the denominator of equation (11) equal to 0 the condition for resonance is obtained. This formula can now be simplified by assuming that a plasma of electrons, and ions of U235 and U238 is pumped. It is further assumed that pumping takes place at the resonant frequency for U235 and that the collision frequency is much less than the difference in cyclotron frequencies for the two uranium isotopes. Then one obtains the following equation for resonance:

$$0 = 1 + \frac{\omega_{pe}^2}{\omega_{ce}^2} + \frac{\omega_{p238}^2}{\omega_{c238}^2 - \omega_{c235}^2} + \frac{\omega_{p235}^2}{2i\nu\omega_{c235}} \tag{13}$$

$$\omega_{pj}^2 = \frac{4\pi n_{je}^2}{m_j} \tag{13a}$$

In the above formula $n_j$ is the desired number of species $j$ and $m_j$ is the mass of species $j$.

In the above formula $\omega_p$ again stands for the plasma frequency, the subscript $e$ stands for the electron and 235 and 238 indicate the respective values for the two uranium isotopes. In the above formulas for simplicity the effects on the cyclotron frequency of molecular masses instead of simple ions have been neglected. Assuming now that the ion density $n = 10^{11}$, and B the magnetic field is $10^4$ gauss, the following relation holds.

$$\omega_{c235}^2 - \omega_{c238}^2 = \frac{\omega_{c235}^2}{40} \tag{14}$$

Accordingly, $\omega_{c235} = 40 \, B = 4 \times 10^5$.

It should be noted that a steady longitudinal magnetic field substantially constrains the electrons but not the ions. In other words the ions can assume a substantial transverse motion. Therefore, if the plasma consists of ions and electrons the electrons are contained in a thin cylinder along the axis of the tube so that the electric charges are generally neutralized. However, the ions are capable of making transverse excursions outside of this cylinder, particularly when they are heated, that is when they have acquired energy.

The attraction exerted by the electrons on the positive ions tends to force the ions back toward the axis of the tube. The transverse motions of the major isotope result in a larger charge separation. This in part explains why the collective resonant frequency is different for different isotopes. In this case also the plasma should extend over a greater length so that the electrons cannot move axially out of the plasma and return along other field lines.

On the other hand, if the plasma consists of positive and negative ions then the plasma need not be of such great length. The isotope which resonates with the applied oscillating frequency tends to assume a greater translational velocity and hence moves away further from the axis. When the minor species is excited the motion of the major species tends to be in the opposite direction and thereby compensates for the charge separation. This effect can be used in accordance with the present invention for the separation of the isotopes. The different translational velocity is made use of in the probe of FIG. 1b. A potential may be applied to the collector 35 such that only the more energetic isotope is able to reach the collector.

The apparatus of FIGS. 1a and 1b has been successfully operated for the enrichment of both potassium and chlorine isotopes. The plasma in the apparatus of FIG. 1a consisted of a column 5 centimeters in diameter and 1 meter long. The number of particles was between $10^9$ and $10^{10}$ per cubic centimeter. The temperature of the ions and electrons corresponds to an energy of 0.2 eV. The ion velocity was $7 \times 10^4$ centimeter per second. The steady magnetic field was between 2 and 3.5 kilogauss (KG). The oscillating magnetic field was 15G or 30G peak-to-peak. The Larmor radius is 1.5 millimeter and the collective resonant frequency of the minor isotope is between 70 and 73.6 KHz.

Ions were observed which had an energy up to 3 eV when the plasma is driven at the collective resonant frequency of $^{41}K$. The current observed with the probe of FIG. 1b which may be viewed as an ion energy analyzer was plotted as a function of the frequency of the oscillating magnetic field for various probe potentials. The shift between the collective resonant frequencies of the two ion species increases as the plasma density is increased. The width of the resonant peak is on the order of 2% which may be due to ion transit time broadening. It further increases as the plasma noise level increases.

The enrichment factors can be computed by extrapolating the resonance obtained for $^{39}K$ symmetrically toward the $^{41}K$ resonances. From this data enrichment factors between 20% and 83% were found, depending on the retarding potential applied to the probe of FIG. 1b. The lower the probe potential, the higher the enrichment factor.

When the oscillating magnetic field is suddenly turned off it takes about 1 millisecond for the energetic ions to disappear. This indicates that the observed resonances are bulk plasma resonances rather than localized resonances near the probe. By increasing the pump power the collection rate can be increased. Further, better resolutions can be achieved with higher magnetic fields because the difference frequency between the two resonant frequencies increases linearly with the magnetic field.

Similar results have been obtained with a mixture of K+, Cl− and electrons. A separation between 35 Cl and 37 Cl was observed in the manner previously described.

Figure 2:
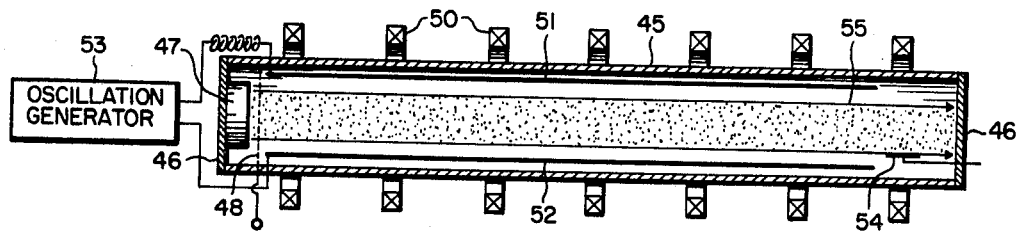
FIG. 2 is a schematic cross-sectional view of another modified Q-machine utilizing an oscillating electric field for separating the isotopes of a desired element from each other.

The ions of a neutral plasma can also be excited or heated by apparatus different from the illustrated in FIGS. 1a and 1b. Such apparatus is illustrated in FIG. 2 to which reference is now made. The apparatus of FIG. 2 is again a modified Q machine and includes a closed container 45 which may, for example, have a square or rectangular cross-section and the container 45 may be closed by end plates 46. The ions may be generated as shown schematically by the box 47 which may be identical to the oven 16 and hot plate 17 in FIG. 1a. In any case, positive potassium ions or some other suitable ions issue from the box 47. They are now accelerated by an accelerator grid 48 to which a suitable negative voltage is applied. A source of electrons must also be provided to generate a neutral plasma. Such an electron source is well known and hence has not been illustrated.

A steady longitudinal magnetic field is generated in the container 45. This may, for example, be effected by the coils 50 surrounding the container 45. A pair of conductive parallel plates 51 and 52 are disposed on opposite sides in the container 45. An oscillation generator 53 is connected to the plates 51 and 52 for developing an oscillating electric field at the desired resonant frequency as previously explained. The oscillating electric field of the apparatus of FIG. 2 serves the same purpose as does the oscillating magnetic field of the embodiment of FIG. 1a.

The ions will now travel due to their thermal motion from left to right as viewed in FIG. 2 and may be collected by a probe 54 which may, for example, take the form of the probe of FIG. 1b. The direction of the beam is shown by the arrows 55. Otherwise, the embodiment of FIG. 2 operates in the manner of that of FIG. 1 as previously explained.

Figure 3:
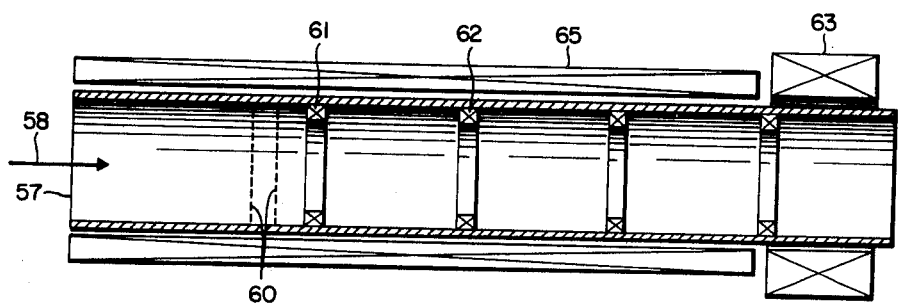
FIG. 3 is a schematic cross-sectional view of another apparatus embodying the present invention and including a plurality of magnetic coils for generating a rippling or varying magnetic field, thereby to impart differential energy to ions moving along the longitudinal axis of the tube.
Figure 4:
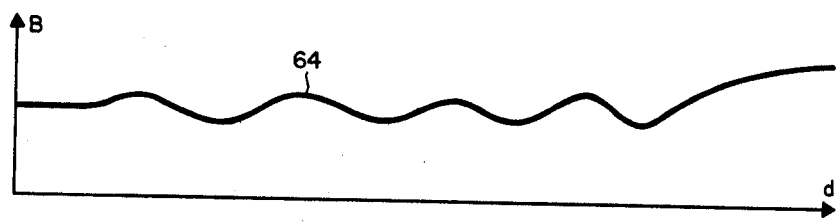
FIG. 4 is a chart plotting the magnetic field of the apparatus of FIG. 3 as a function of distance to illustrate the ripples or undulations of the field as seen by a moving ion.

In accordance with the present invention it is also feasible to impart energy to a selected isotope in a different manner. This is illustrated in FIGS. 3 and 4 to which reference is now made. In the embodiment of FIG. 3 it is assumed that uranium ions are introduced into the tube 57 on the left-hand side as shown by arrow 58. Either positive or negative ions may be used. Negative uranium ions may be generated in the manner previously explained. They are now accelerated by a pair of accelerating grids 60 to which a negative voltage for positive ions or a positive voltage for negative ions is applied so that the accelerated ions move toward the right. It will be understood that the plasma is neutralized again as previously explained by suitably charged ions or by electrons.

A rippling magnetic field is generated by a set of spaced coils 61, 62, ... At the end of the tube a magnetic mirror is generated by the coil 63. The magnetic configuration is illustrated in FIG. 4 where B indicates the magnetic field and $d$ the distance. As clearly shown by the curve 64, the magnetic field is rippled or undulated.

As a result, an ion moving in the direction of arrow 58 sees undulating or oscillating magnetic field lines which are equivalent to the effect of the apparatus of FIGS. 1a and 2. In other words, a moving ion sees an undulating magnetic field. If now the velocity of the ions is properly related to the undulations of the magnetic field, the ions see a resonant frequency which may be the composite resonant frequency of the desired isotope. A uniform longitudinal magnetic field is maintained in addition by the coil 65, thereby to constrain the plasma in the direction of the axis of tube 57.

Figure 5:
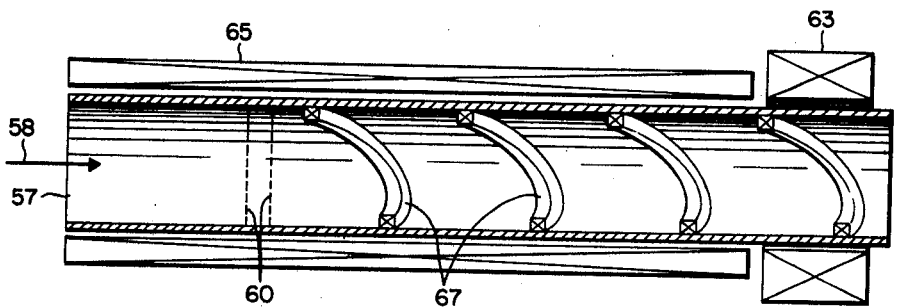
FIG. 5 is a cross-sectional view of apparatus similar to that of FIG. 3 for generating a helical perturbing magnetic field which may also be used for the separation of isotopes.

A modification of the apparatus of FIG. 3 is shown in FIG. 5 wherein like elements are designated by the same reference numbers. The embodiment of FIG. 5 differs from that of FIG. 3 in that a set of helical coils 67 are provided. These helical coils will produce helical magnetic field lines to aid in propagating the uranium ions in the direction of arrow 58. They will also promote a transverse motion of the ions which will differ for the different isotopes, as explained hereinabove, thereby to facilitate the eventual separation of the isotopes.

SEPARATION OF THE ISOTOPES

In the previous portion it has been explained how the isotopes of an element can be differentially heated, that it can be made to assume different energies. In the subsequent portion of this description it will be explained how the isotopes of different energies can be physically separated from each other to provide an isotope enrichment or separation.

By way of example, this may be accomplished by the probe 22 of FIG. 1a or that of FIG. 1b. However, there are many other ways in which isotopes can be separated from each other on the basis of their differential energies. This may, for example, be effected by means of a source of magnetic barriers separated by field-free spaces which permits a more rapid diffusion of more energetic ions across a field-free space between successive magnetic fields. Such an embodiment of the invention is illustrated in FIGS. 6 and 7 to which reference is now made.

Figure 6:
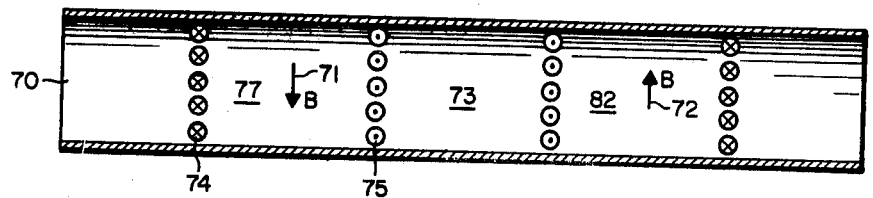
FIG. 6 is a schematic cross-sectional view of apparatus providing adjacent magnetic fields with field-free spaces therebetween to cause differential diffusion of desired isotopes, thereby to separate the isotopes from each other.

FIG. 6 illustrates schematically a closed container 70 in which suitable coils are provided, not illustrated for the sake of clarity. They generate a magnetic field B going in a downward direction as shown by arrow 71 and another magnetic field going in an upward direction as shown by arrow 72. The two magnetic areas are separated by a field-free space 73. The symbols 74 indicate that the current in the coils flows downwardly while the symbols 75 indicate electric current in the coils flowing upward from the paper plane.

Figure 7:
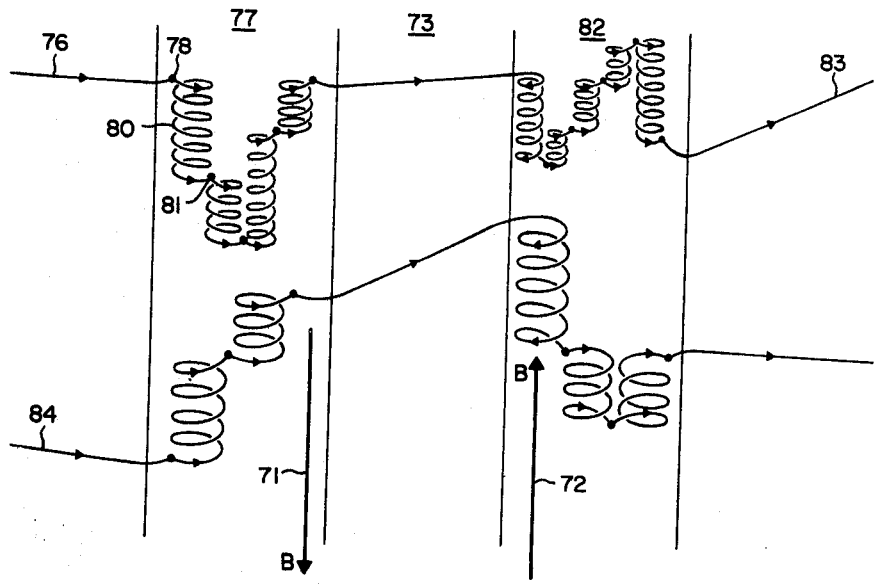
FIG. 7 is a schematic sectional view illustrating the behavior of particles in the device of FIG. 6 to illustrate the differential diffusion.

FIG. 7 illustrates by way of example the path of an ion 76 as it enters the space 77 having a downwardly directed magnetic field 71. The particle collides, as shown at 78, with another particle and its path is changed to provide a downward spiral illustrated at 80. By subsequent collisions such as shown at 81, the particle moves eventually into the field-free space 73 and then into the second magnetic field space 82 and eventually emerges as shown at 83. The diffusion time of the particle 76 depends on the Larmor radius which is the radius of the spiral 80. Each collision of the particle transports the orbit of the ion by up to the diameter of its helix such as 80.

It will be understood, of course, that as a result of each collision a particle has roughly an equal probability of being moved toward the left instead of toward the right. However, for the sake of clarity only those collisions have been illustrated which are of interest here. A similar path of a second, more energetic particle 84, is also depicted.

It should be noted that if collisions with neutral particles dominate so that the scattering cross-section is only weakly dependent on energy, the more energetic species of ion will diffuse across the magnetic spaces 77 and 82 more rapidly than the less energetic ions.

It is also feasible to use magnetic mirrors to confine the hotter species while the cooler or less energetic ions flow out of the mirror space. Such an embodiment of the present invention has been illustrated in FIG. 8 to which reference is now made.

Figure 8:
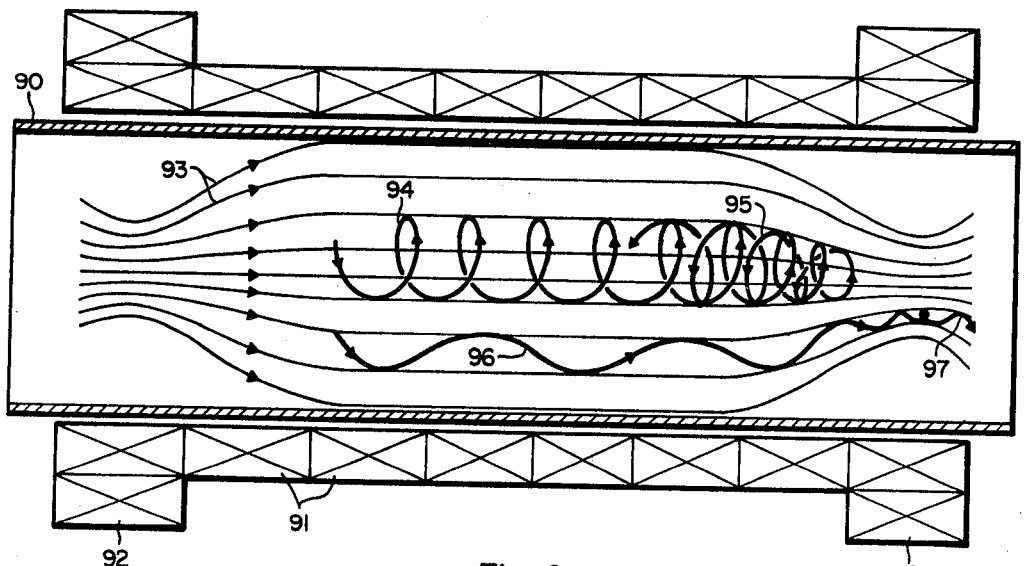
FIG. 8 is a schematic cross-sectional view illustrating a tube provided with magnetic mirrors at both ends to effect diffusion of a less energetic isotope therethrough while retaining the more energetic isotope.

FIG. 8 illustrates an apparatus comprising a container 90 which may be of circular cross-section and which should be closed at both ends, not shown. A suitable dense, neutral plasma including, for example, the uranium isotopes is introduced into the cylinder 90. A longitudinal magnetic field is generated by the coils 91 surrounding the cylinder 90. Additional magnetic coils are provided at both ends as shown at 92 to provide a magnetic mirror at both ends of the tube 90. The plasma, of course, must be introduced into the magnetic space in the manner previously described and the ions must be differentially heated.

The magnetic lines of force are shown schematically at 93. An energetic ion is shown at 94 and its helical path.

As an ion moves into the mirror region its transverse motion builds up at the expense of its longitudinal motion. The effect is stronger the longer the initial transverse motion. Hence, an ion which has been heated in the transverse direction upon reaching the right-hand end is returned toward the left as shown at 95, because it does not have enough longitudinal motion energy to pass through the mirror.

The path of a less energetic ion is shown at 96. Conversely because this ion has less energy, it has less transverse motion and hence comparatively speaking a larger longitudinal motion. Due ot its higher energy in the longitudinal direction, it can escape the magnetic mirror as shown at 97. As a result, the less energetic ions escape the mirror, while the more energetic ions are confined by the two mirrors. This is one scheme for separating the energetic from the less energetic ions.

Figure 9:
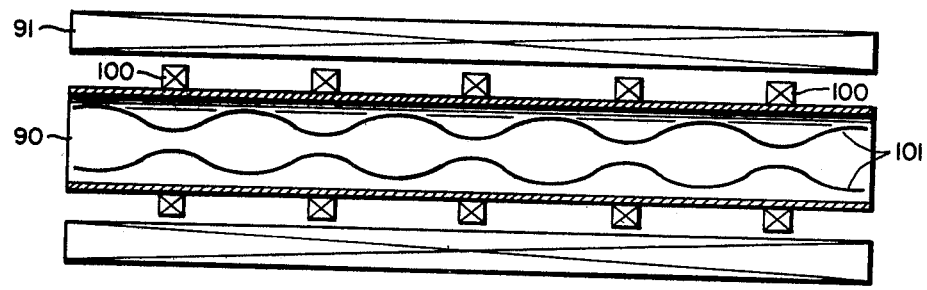
FIG. 9 is a schematic cross-sectional view of another machine showing multiple magnetic mirrors to illustrate the differential diffusion of isotopes through the device for the purpose of separating them.

Instead of confining the plasma between two mirrors it is also feasible to cause diffusion of the plasma through a multiplicity of mirrors. Such a structure has been illustrated in FIG. 9. Again the plasma is contained in a cylindrical tube 90 which may be closed at its far ends. A longitudinal magnetic field is generated by a coil 91 providing a steady field. The magnetic mirrors are provided by a plurality of spaced coils 100. The resulting magnetic field lines are indicated at 101. It will be noted that the field lines converge at each of the mirror coils 100. Accordingly, this structure will provide a differential diffusion of the less energetic ions through the multiplicity of mirrors 100. On the other hand, the more energetic ions tend to be retained by each of the magnetic mirrors in the manner previously explained.

Figure 10:
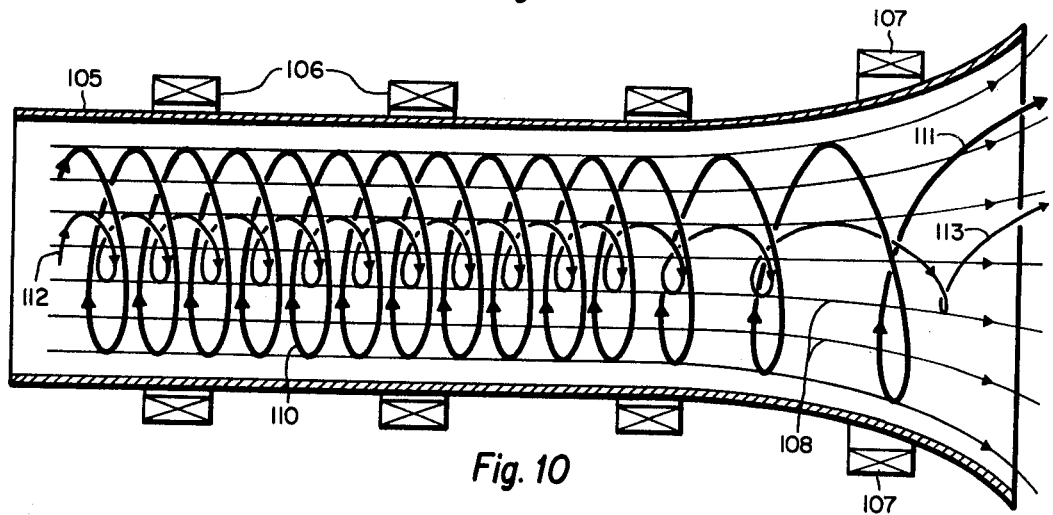
FIG. 10 is a cross-sectional view of apparatus providing a magnetic nozzle for generating a diverging magnetic field for the purpose of separating isotopes in accordance with their energy.

Another method of separating isotopes on the basis of their differential energy may be effected by means of a so-called magnetic nozzle. As shown in FIG. 10, the plasma is introduced into an outwardly flared tube 105 which generally has the shape of a trumpet or bell. The bell-shaped tube 105 may again be of cylindrical cross-section and may be provided with spaced magnetic coils as shown at 106. The coil 107 has a larger diameter to accommodate the shape of the bell-like tube 105. As a result, the magnetic field lines 108 are outwardly curved to provide the magnetic nozzle. The path of an energetic particle is shown at 110. It is characterized by a relatively large transverse velocity component. At the left-hand side of tube 105 the magnetic field is relatively high and is correspondingly lower on the right-hand side. Accordingly, the perpendicular velocity of the more energetic ion in the left-hand side is converted to a more parallel velocity on the right-hand side as shown in 111. Accordingly, the more energetic particles are ejected basically at an angle to the longitudinal axis of symmetry.

On the other hand, a non resonant isotope, that is an isotope of lower energy, has the path shown at 112. It has a smaller transverse velocity as previously explained. The parallel or axial energy of the low energy ions also increases toward the right of FIG. 10, but to a much smaller extent because the total energy, that is the parallel and transverse energies, must be conserved. The different isotopes can be separated on the basis of their axial energies as, for example, by using energy selective devices similar to those proposed for the direct energy conversion on mirror fusion devices. They may also be separated by simply passing them through suitably biased grids. Spatial separation is also possible. It is, of course, assumed that the ions have previously been heated or given differential energies.

In general, the magnetic nozzle of FIG. 10 converts the energy perpendicular to the magnetic field lines of energetic isotopes into energy parallel to the magnetic field lines which can then be used to separate the isotopes.

Figure 11:
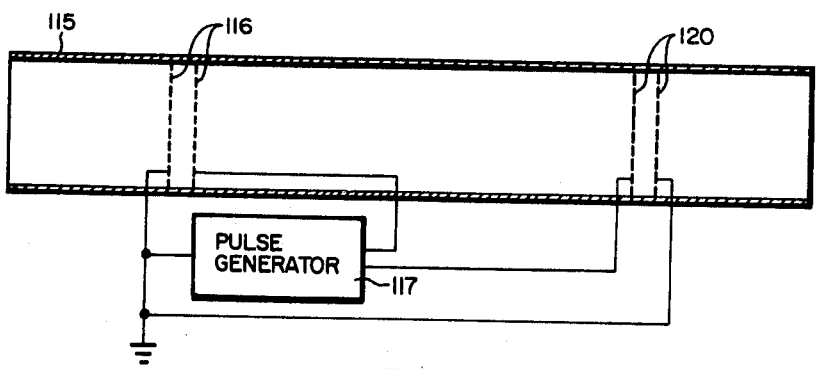
FIG. 11 is a cross-sectional schematic view of yet another apparatus for separating isotopes from each other on the basis of their differential velocities due to an electric field resulting in a differential time of flight.

Alternatively, it is possible to separate the more energetic ions from the less energetic ions by their differential time of flight. This may be accomplished with the apparatus of FIG. 11. The plasma is confined again in a tube 115 and the ions are differentially heated so that the more energetic ions move faster or have a higher velocity than that of the low energy ions. Actually, the ions may simply be accelerated initially by a pair of grids 116 arranged at the left-hand side of the tube 115. Suitable pulses are applied between the grids 116 by a pulse generator 117 and the pulses are illustrated in FIG. 2 at 118. The duration of each pulse 118 and the off time are determined by the desired velocity of the accelerated ions.

Figure 12:
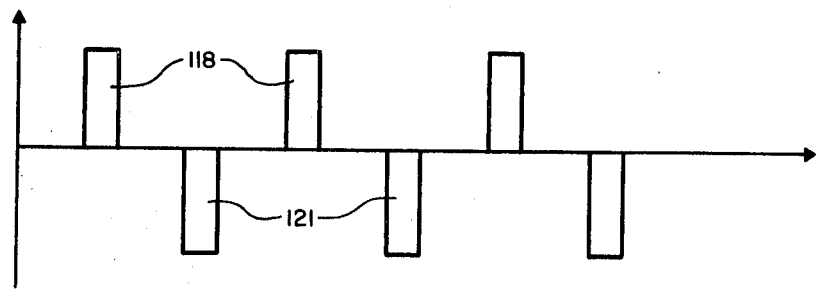
FIG. 12 is a chart illustrating a set of pulses used for accelerating the ions of the plasma and another set of pulses for separating the ions in accordance with their differential time of flight.

The velocity of the lighter ion is somewhat larger than that of the heavier ion so that the lighter ion will arrive first at a second pair of grids 120. A suitable decelerating voltage is now applied by the pulse generator 117 to the decelerating grids 120. These pulses are illustrated in FIG. 12 at 121 and are of the opposite polarity than that of the acceleration pulses 118. These pulses are so timed with respect to the accelerating pulses 118 that they will permit a faster ion to pass but will repel the slower ion. However, unless the duration of each accelerating pulse 118 is relatively short and the accelerating voltage is relatively low, the required length of tube 115 may be relatively large.

Figure 13:
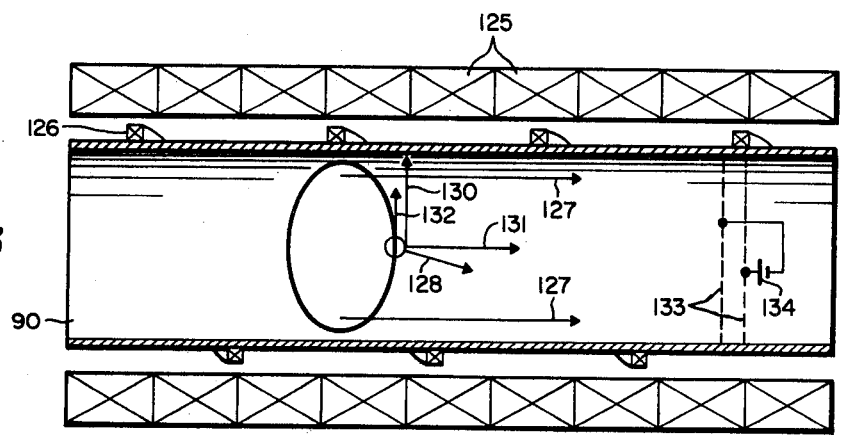
FIG. 13 is a cross-sectional schematic view of another apparatus in accordance with the present invention for separating isotopes by means of the synchronous wave pressure generated by a steady magnetic field and an oscillating helical magnetic field.

The isotopes may also be separated by utilizing the wave pressure of the cyclotron wave on the resonant isotope. In this case it may be desirable to include another gas besides uranium to facilitate the propagation of the cyclotron waves. This may be effected in the apparatus of FIG. 13. Here again the plasma is confined in a cylindrical tube 90. A series of coils 125 surrounds the tube 90 to generate a longitudinal magnetic field. A helical coil 126 is also disposed surrounding the tube 90 to generate a helical field which is made to oscillate by connecting the coils 126 to a suitable oscillation generator as shown in FIGS. 1a and 2.

The steady magnetic field is indicated by the parallel arrows 127. The oscillating magnetic field is indicated by the arrow 128. The resulting electric field is shown at 130 which, of course, oscillates. The parallel force vector is illustrated at 131 and the velocity of the particle is shown at 132. A longitudinal force is exerted by the cyclotron wave on the ions. Those ions which are resonant are subjected to a proportionately stronger force. This stronger force is sufficient to overcome an elastrostatic barrier shown schematically by the grids 133 between which a voltage is applied by the voltage source 134. This now makes it possible to separate by electric repulsion forming an electric barrier the more energetic from the less energetic ions. The so-called hotter ions escape toward the right while the other ions are confined.

Figure 14:
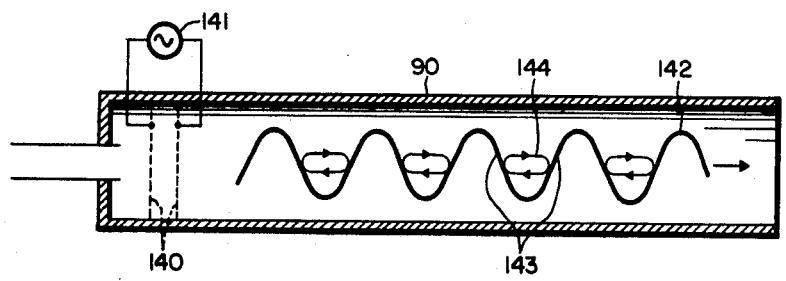
FIG. 14 is a schematic cross-sectional view of apparatus for separating isotopes by means of ion acoustic wave trapping.

It is also feasible to make use of acoustic waves for trapping the faster or lighter isotope. This is illustrated in FIG. 14 where again 90 indicates a cylindrical tube in which the plasma is confined. The acoustic wave is launched by the grids 140 to which an oscillating voltage is applied by a generator 141. This will create large amplitude acoustic waves of the ions. The acoustic wave is shown schematically at 142. The ions of the lighter isotope move faster and hence more nearly at the velocity of the wave and thus may be trapped in the wave trough 143 as shown at 144.

The plasma contains relatively hot electrons and relatively cold ions. The acoustic wave moves faster than the mean thermal speed of the ions. However, the lighter ions have a slightly higher thermal velocity and move more nearly at the speed of the acoustic wave. Those ions moving at the speed of the acoustic wave are trapped by the wave which moves towards the right. Hence more light ions are trapped. On the other hand, the less energetic ions are left behind.

Figure 15:
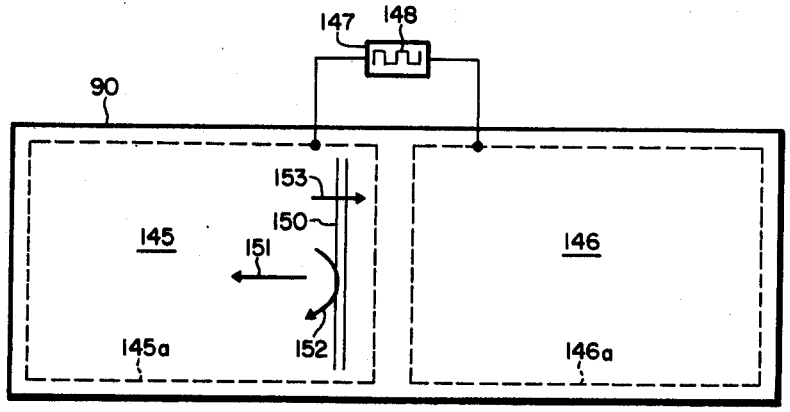
FIG. 15 is a schemtic cross-sectional view of apparatus for preferentially scattering ions on the basis of their mass by collisionless shocks.

Finally, as shown in FIG. 15, collisionless shock may be utilized for scattering the lighter ion while permitting the heavier ion to pass. The plasma is contained in a container 90 divided into two regions 145 and 146 by means of suitable closed grids or cages 145a, 146a respectively. The plasma containing uranium or some other isotope is contained essentially in the cage 145a. The two cages 145a and 146a which may, for example, consist of wire grids, may be pulsed by a pulse generator 147 which generates the pulses 148. Since the two cages now have different potentials a shock front is launched into one section shown schematically at 150. The shock front moves toward the left as shown by arrow 151. This shock front 150 preferentially scatters the lighter ion as shown at 152. The heavier ion shown by arrow 153 is relatively unaffected and remains behind. Hence the lighter ion is preferentially concentrated and collected at the left-hand end of the tube 90. The potentials of the two cages 145 and 146 determines in turn the plasma potential.

There has thus been disclosed a method of and apparatus for separating isotopes or enriching a desired isotope. This is accomplished in a dense neutral plasma. Various methods have been disclosed for generating such a plasma consisting, for example, of alkali metals or uranium. Differential energies may be imparted to the isotopes, for example, by accelerating them under an electric field so their velocity depends on their mass. Alternatively, differential energy may be imparted to the isotopes by subjecting them to a resonant frequency which differs for each isotope. Finally, various devices have been disclosed for physically separating or enriching the desired isotope on the basis of their different energies. This may, for example, be effected by differential diffusion through a magnetic field or magnetic mirrors or by utilizing a magnetic nozzle. Alternatively, a selected isotope may be trapped in an acoustic wave or the isotopes may be differentially scattered depending on their mass by collisionless shocks. Finally, the synchronous wave pressure may be utilized for separating the isotopes. The energetic isotopes may also be separated from the less energetic isotopes by energy dependent chemical reactions as previously described.

What is claimed is:

1. The method of separating one isotope of an element from the others which comprises the steps of:
    (a) generating a dense, substantially electrically neutral plasma including an element having at least two ionized isotopes to be separated;
    (b) generating a substantially steady magnetic field extending through the plasma and substantially parallel to a longitudinal axis;
    (c) imparting more energy to a selected isotope than to the other isotopes while the element is in the magnetic field by subjecting the element to its resonant frequency determined by the plasma density, the strength of the magnetic field, and the ratio of the charge to the mass of the selected isotope, the plasma being large enough to encompass the orbital paths of the isotopes;
    (d) generating a second steady magnetic field; and
    (e) separating the isotopes from each other on the basis of their differential energies by causing the isotopes which have received different energies to diffuse across the second magnetic field, whereby the isotopes having different energies will diffuse at different rates.

2. The method of separating one isotope of an element from the others which comprises the steps of:
    (a) generating a dense, substantially electrically neutral plasma including an element having at least two ionized isotopes to be separated;
    (b) generating a substantially steady magnetic field extending through the plasma and substantially parallel to a longitudinal axis;
    (c) imparting more energy to a selected isotope than to the other isotopes while the element is in the magnetic field by subjecting the element to its resonant frequency determined by the plasma density, the strength of the magnetic field, and the ratio of the charge to the mass of the selected isotope, the plasma being large enough to encompass the orbital paths of the isotopes; and
    (d) separating the isotopes from each other on the basis of their different energies by generating a plurality of spaced magnetic mirror fields in the plasma region, thereby to confine the more energetic isotope while permitting the less energetic isotope to pass through the magnetic mirror fields.

3. The method of separating one isotope of an element from the others which comprises the steps of:
    (a) generating a dense, substantially electrically neutral plasma including an element having at least two ionized isotopes to be separated;
    (b) generating a steady magnetic field along a longitudinal axis;
    (c) injecting the plasma into the magnetic field;
    (d) moving the ionized isotopes by plasma expansion along the longitudinal axis in a predetermined direction;
    (e) imparting more energy to a selected isotope than to the other isotopes while the element is in the magnetic field by subjecting the element to its resonant frequency determined by the plasma density, the strength of the magnetic field, and the ratio of the charge to the mass of the selected isotope, the plasma being large enough to encompass the orbital paths of the isotopes; and
    (f) separating the isotopes from each other by generating additional spaced magnetic fields substantially at right angles to the longitudinal axis with a substantially field-free space therebetween, whereby the more energetic ionized isotope preferentially migrates long the longitudinal axis in the predetermined direction across the magnetic fields and the field-free space therebetween.

4. The method of separating one isotope of an element from the others which comprises the steps of:
    (a) generating a dense, substantially electrically neutral plasma including an element having at least two ionized isotopes to be separated;
    (b) generating a steady magnetic field along a longitudinal axis;
    (c) injecting the plasma into the magnetic field;
    (d) moving the ionized isotopes along the longitudinal axis in a predetermined direction;
    (e) imparting more energy to a selected isotope than to the other isotopes while the element is in the magnetic field by subjecting the element to its resonant frequency determined by the plasma density, the strength of the magnetic field, and the ratio of the charge to the mass of the selected isotope, the plasma being large enough to encompass the oribital paths of the isotopes; and
    (f) separating the isotopes from each other by generating two additional magnetic fields spaced from each other substantially normal to and along the longitudinal axis to provide spaced magnetic mirrors, whereby the more energetic ionized isotope tends to be confined by the mirrors while the less energetic isotope tends to pass the magnetic mirrors.

5. The method of separating one isotope of an element from the others which comprises the steps of:
    (a) generating a dense, substantially electrically neutral plasma including an element having at least two ionized isotopes to be separated;
    (b) generating a steady magnetic field along a longitudinal axis, the steady magnetic field having field lines which diverge outwardly in the area of one end of the magnetic field from the longitudinal axis;
    (c) injecting the plasma into the magnetic field;
    (d) moving the ionized isotopes along the longitudinal axis toward the diverging field lines;
    (e) imparting more energy to a selected isotope than to the other isotopes while the element is in the magnetic field by subjecting the element to its resonant frequency determined by the plasma density, the strength of the magnetic field, and the ratio of the charge to the mass of the selected isotope, the plasma being large enough to encompass the orbital paths of the isotopes; and (f) separating the isotopes from each other by the diverging field lines, thereby to permit spatial separation thereof.

6. Apparatus for separating the isotopes of an element from each other in a dense, substantially electrically neutral plasma comprising:
(a) an elongated evacuated container having a longitudinal axis;
(b) means for generating a dense, substantially electrically neutral plasma and injecting it into said container and for propagating the ions along said axis in a predetermined direction;
(c) means for imparting differential energies to the ionized isotopes by subjecting the element to its resonant frequency; and
(d) means for generating spaced magnetic fields in said container substantially at right angles to said longitudinal direction, having a field-free space therebetween, whereby the more energetic ionized isotope will preferentially migrate across the transverse magnetic fields and the field-free space.

7. The method of separating one isotope of an element from the others which comprises the steps of:
(a) generating a dense, substantially electrically neutral plasma including an element having at least two ionized isotopes to be separated;
(b) generating a substantially steady magnetic field extending through the plasma and substantially parallel to a longitudinal axis;
(c) applying an additional steady magnetic field to the plasma varying periodically in magnitude along a predetermined direction;
(d) causing the ions of the element to be separated to move along the predetermined direction and within the two magnetic fields so that the ions experience variations of the resultant magnetic field corresponding to the desired resonant frequency of a selected isotope determined by the plasma density, the strength of the resultant magnetic field, and the ratio of the charge to the mass of the selected isotope, the plasma being large enough to encompass the orbital paths of the isotopes; and
(e) separating the isotopes from each other on the basis of their differential energies by providing along the predetermined direction an additional magnetic field of such a magnitude to permit substantially all less energetic ions to pass along the predetermined direction through the additional magnetic field while reflecting substantially all most energetic ions corresponding to the selected isotope.

8. The method defined in claim 7 wherein the additional magnetic field is helically perturbed to produce helical magnetic field lines, whereby the ions of the element to be separated are caused to move through the magnetic field lines.

9. Apparatus for separating the isotopes of an element from each other comprising:
(a) an elongated evacuated container;
(b) means for generating a steady magnetic field in said container having a longitudinal axis;
(c) means for generating spaced steady magnetic fields in said container along said longitudinal axis;
(d) means for generating a dense, substantially electrically neutral plasma in said container and for injecting the resulting plasma into the magnetic field;
(e) means for causing the ionized isotopes to move in a predetermined direction along said longitudinal axis and at a predetermined velocity correlated to the resonant frequency of a desired isotope and correlated to the spacing of the spaced magnetic fields, whereby the moving ions see a variation of the magnetic field for imparting to them an energy relates to their collective resonant frequency; and
(f) means for separating the isotopes from each other on the basis of their differential energies including a magnetic mirror disposed along said predetermined direction.

10. Apparatus as defined in claim 9 wherein said means for generating spaced magnetic fields in said container provides spaced helical magnetic fields to impart additional longitudinal motion to said ions.

* * * * *

UNITED STATES PATENT AND TRADEMARK OFFICE
CERTIFICATE OF CORRECTION

PATENT NO. : 4,081,677
DATED : March 28, 1978
INVENTOR(S) : John M. Dawson

It is certified that error appears in the above-identified patent and that said Letters Patent are hereby corrected as shown below:

Column 1, Line 19: after the word "insight" insert --into--.

Column 2, Line 50: change "by" (first occurrence) to be --be--.

Column 3, Line 7: change "re" set forth to be --are set forth--

Column 15, Line 56: change "acceleration pulses" to be --accelerating pulses--

Column 20, Line 34: change "relates to their" to be --related to their--.

Signed and Sealed this

Third Day of July 1979

[SEAL]

Attest:

LUTRELLE F. PARKER

Attesting Officer

Acting Commissioner of Patents and Trademarks